United States Patent [19]

Gosset et al.

[11] 4,201,488
[45] May 6, 1980

[54] RECORDING/CONTROL ARRANGEMENT FOR A DOT RECORDING MACHINE

[75] Inventors: Cyrille Gosset, Danjoutin; Jean-Marc Thomas, Valdoie, both of France

[73] Assignee: Compagnie Internationale pour l'Informatique, Paris, France

[21] Appl. No.: 914,988

[22] Filed: Jun. 12, 1978

[30] Foreign Application Priority Data

Jun. 21, 1977 [FR] France .................................. 77 19000

[51] Int. Cl.² .............................................. B41J 3/10
[52] U.S. Cl. ..................................... 400/121; 400/124
[58] Field of Search .......................... 101/93.04, 93.05; 400/118, 119, 120, 121, 124; 346/76 PH

[56] References Cited

U.S. PATENT DOCUMENTS

| | | | |
|---|---|---|---|
| 3,157,456 | 11/1964 | Kikuchi | 346/78 |
| 3,890,623 | 6/1975 | Schmid et al. | 178/30 X |
| 4,024,506 | 5/1977 | Spaargaren | 400/124 X |
| 4,070,680 | 1/1978 | Shelley | 346/76 PH |

*Primary Examiner*—Paul T. Sewell
*Attorney, Agent, or Firm*—Lowe, King, Price and Becker

[57] ABSTRACT

A dot printing matrix head having printing elements on multiple rows and columns is moved so the columns of the head are translated relative to a medium on which characters are printed. The elements have a predetermined arrangement so that: (1) in each column and row there is at least one element, and (2) there are no elements in adjoining row positions whereby there is no interference between the elements in response to simultaneous activation of any pair of the elements. The elements in different columns of the matrix are activated at differing times in response to signals from at least one shift register bank, a data bit generator and a shift column control circuit as the different matrix columns become aligned with the same column of dots to be printed.

8 Claims, 8 Drawing Figures

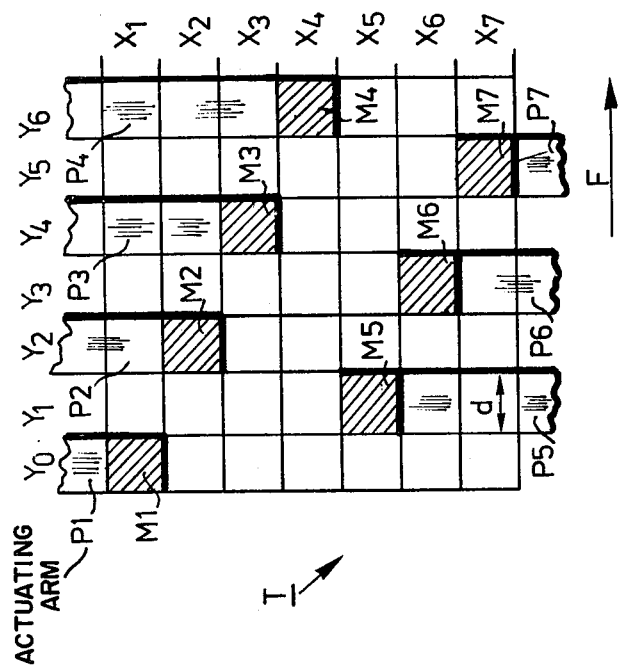
FIG:2
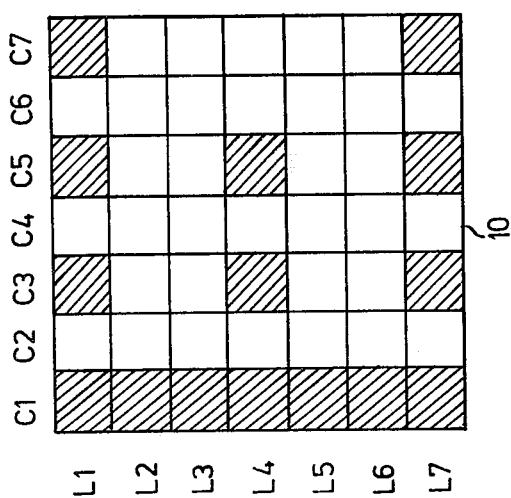
FIG:1

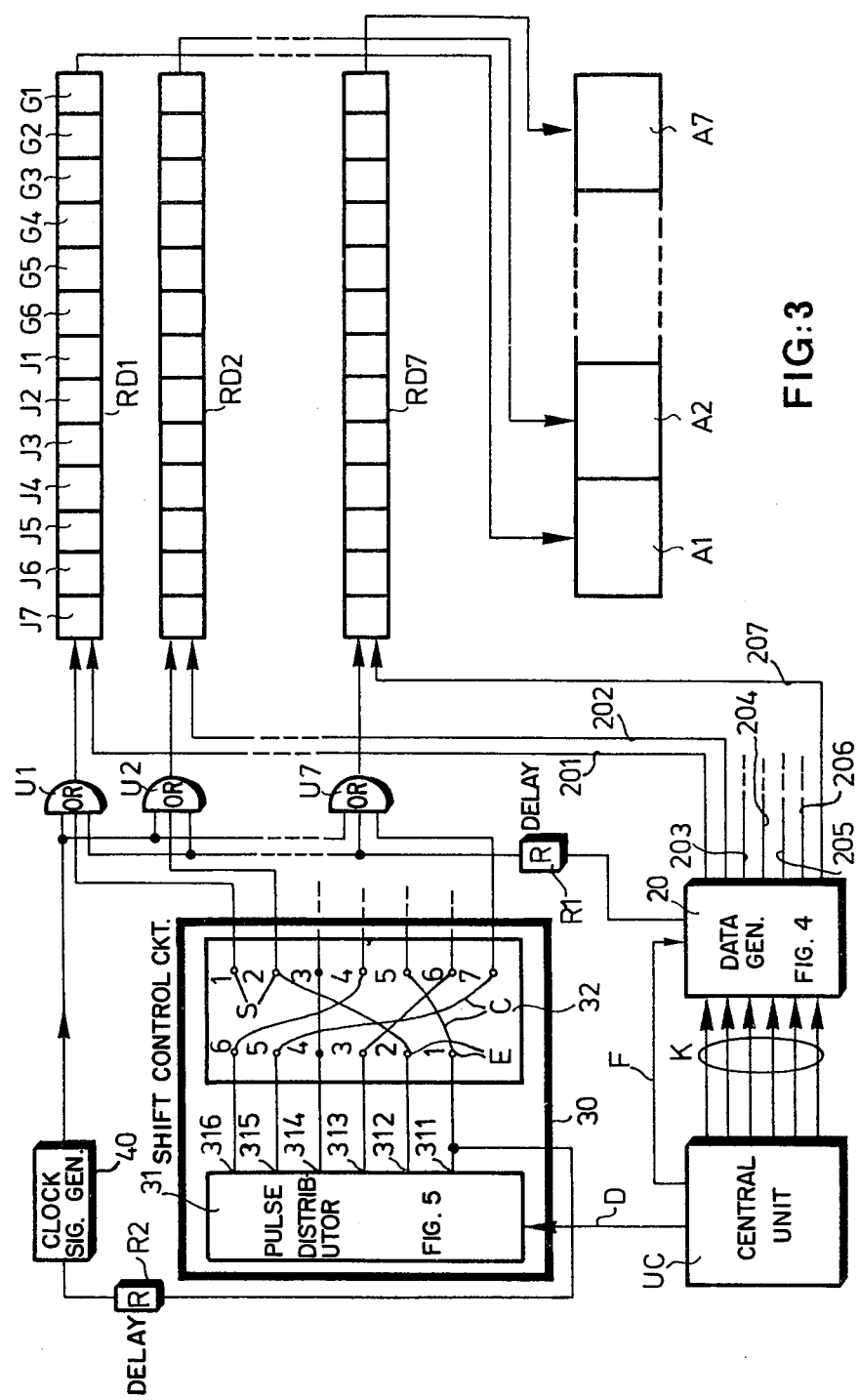
FIG:3

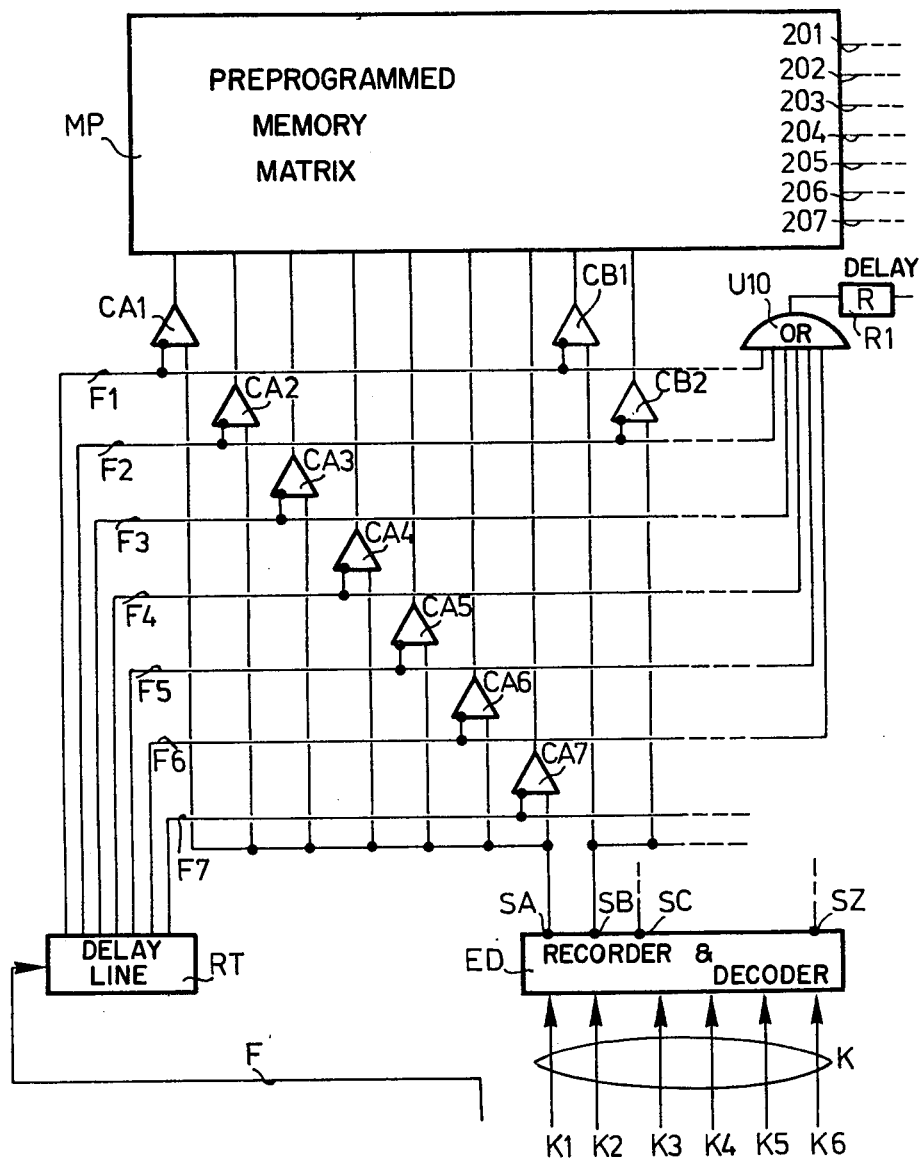
FIG:4

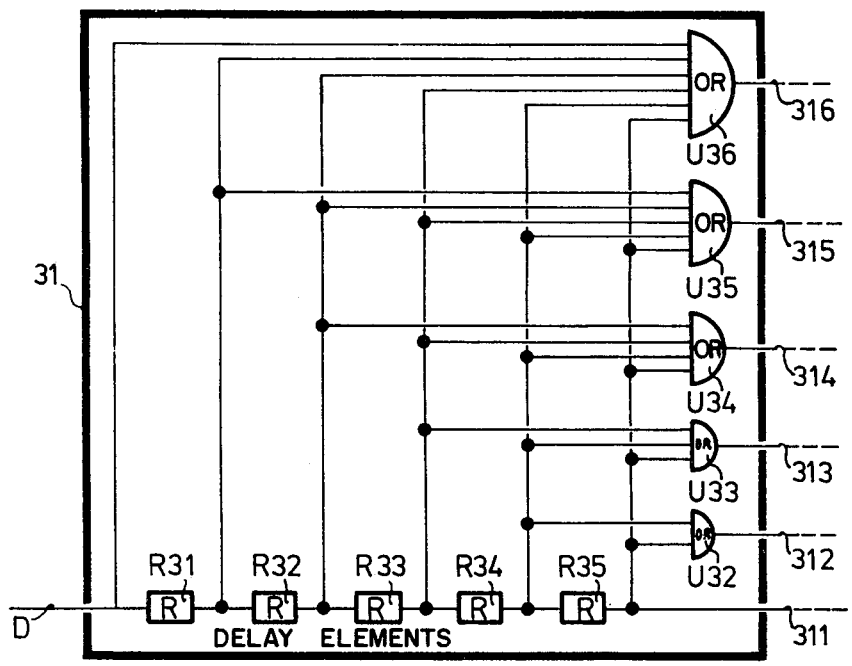
FIG:5

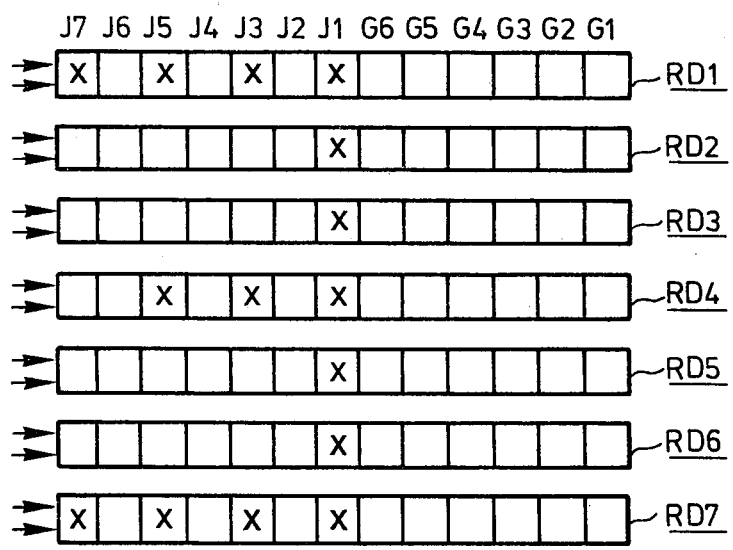
FIG: 6
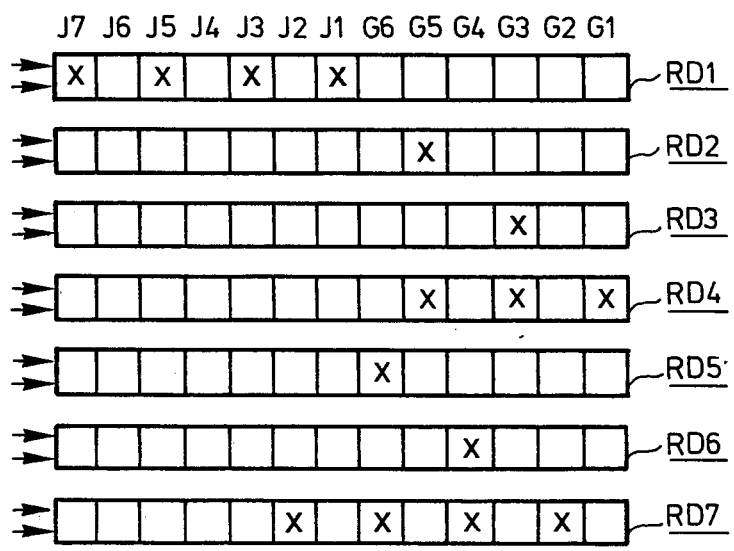
FIG: 7

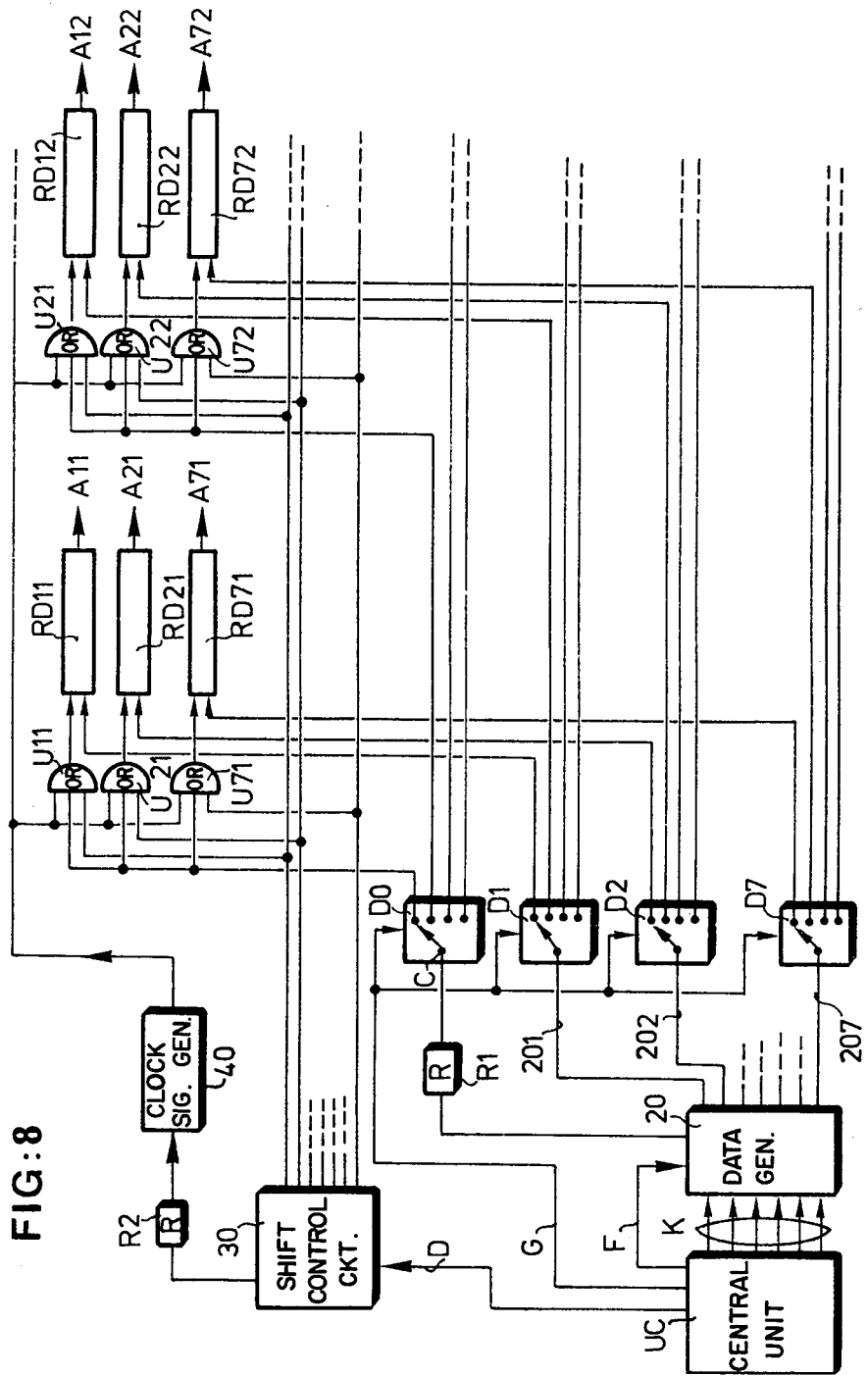
FIG:8

RECORDING/CONTROL ARRANGEMENT FOR A DOT RECORDING MACHINE

FIELD OF THE INVENTION

The present invention relates to a recording control arrangement for a dot recording machine. Such an arrangement may be applied particularly, although not exclusively, to dot printing machines wherein a character is printed from a set of dots lying in a rectangular matrix including n rows and m columns, n and m being whole numbers greater than one.

BACKGROUND OF THE INVENTION

Dot printing machines generally have one or more printing heads which can be moved along a recording medium, usually formed by a strip of paper. Each head has a group of recording styli or needles which are selectively actuated at predetermined times, in order to print a quantity of individual dots which form a character on the paper.

In certain dot printing machines, the recording styli in each head are arranged in a rectangular matrix including 5×7=35 styli. A character is printed by actuating simultaneously those styli which print the dots making up the character image. In other dot printers, each head has only seven styli aligned along the paper in a row perpendicular to a print line. With the latter arrangement, a character is printed by stepping the printing head and energizing the styli required to form the dots for the appropriate part of the character between two successive steps. Thus, the whole character may be printed by the printing head in five steps.

The movement of the recording styli in dot printing machines is controlled by actuating devices associated with respective ones of the styli. For example, each actuating device may be of the type described and illustrated in French Pat. No. 2,218,746 corresponding to U.S. Pat. No. 3,971,311, wherein a flat electro dynamic coil, secured to a plate mounted to pivot about an axis parallel to the print line, is subjected to the effect of a magnetic field perpendicular to its plane. The plate is shaped to form a recording stylus which is moved in the direction of the paper when the coil is energized by a pulse of electric current.

Because the dots forming a character are in close proximity to each other and there is a short distance between the recording styli of one head, it has been found necessary to arrange the actuating devices of one head in such a way that the recording styli are aligned in a direction parallel to one of the diagonals of a printing matrix. This arrangement avoids the mechanical interaction which is likely to occur between two adjoining actuating devices. In this prior art device, the actuating devices are mounted to pivot about the same pivot axis, and the radii of the arcs they describe differ.

BRIEF DESCRIPTION OF THE INVENTION

In the present dot printing machine, recording styli of one head are arranged in a matrix containing n rows and m columns in the ratio of one stylus per row, but the position of the styli within the matrix is completely a matter of choice. Thus, it becomes possible to arrange the actuating devices of one head in such a way that each actuating device is able to pivot about an axis without interacting mechanically with the other actuating devices. The styli elements are arranged to be energized so that in each column and row there is at least one energizable element, but there are no energizable elements in adjoining rows and columns so that there is no interference between the elements in response to simultaneous activation of any pair of elements. The actuating devices may, for example, be positioned on either side of the print line and be mounted to pivot on different axes, as shown in FIG. 3 of French Pat. No. 1,418,061 corresponding to U.S. Pat. No. 3,314,359.

However, in the present invention, it is necessary to energize the actuating devices of one head at different times when it is desired to print a vertical line on the paper. Therefore, it is essential to have a control arrangement which takes account of the position of each recording stylus in the above mentioned matrix of n rows and m columns.

The present invention relates to a recording control arrangement for a dot recording machine in which the machine has a dot recording medium and at least one recording head having n electric pulse responsive recording styli arranged in a matrix of n rows and m columns in the ratio of one stylus per row. The medium and the head are relatively displaceable in the direction of the rows. The columns are numbered serially from 0 to m−1 in the direction of movement of the head relative to the recording medium.

The control apparatus includes at least one bank of n shift registers, each associated with one recording stylus. Each register has p+m−1 stages, each adapted to contain one data bit to record one dot, wherein p is a whole number greater than one and at least equal to m. A data bit generator serially feeds data bits into the first p stages of the registers in the same way as if the recording styli were aligned in a single column. A shift control circuit serially shifts the data bits recorded in the first p stages of each register to the other m−1 stages in the register. The number of stages which the bits are shifted equals the serial number, q, of the column in which the recording stylus associated with the register is located.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is an illustration of a printed character using the dot printing principle;

FIG. 2 is an illustration of the distribution of the energized recording styli of a printing head of a dot printing machine in accordance with the invention;

FIG. 3 is a block diagram of a recording control apparatus formed in accordance with the invention;

FIG. 4 is a schematic diagram of a data bit generator used in the control apparatus of FIG. 3;

FIG. 5 is a schematic diagram of a pulse distributor used in the control apparatus of FIG. 3;

FIG. 6 is an illustration of the state of the shift registers of the apparatus of FIG. 3 after they have been loaded by the data bit generator;

FIG. 7 is an illustration of the state of the shift registers of the apparatus of FIG. 3 after the data contained in the registers have been shifted; and FIG. 8 is a block diagram of a recording control apparatus formed in accordance with the invention when adapted to the requirements of a printing machine having a plurality of recording heads to print a line of characters.

DETAILED DESCRIPTION OF THE INVENTION

The recording control arrangement described in the following description is particularly applicable to a dot type impact printing machine; however, it will be clear to those skilled in the art that the arrangement could be applied to any other kind of dot printing machine, for example, magnetic, electrostatic or ink drop printers.

Referring to FIG. 1, it can be seen that each character to be printed, such as the character "E" which is illustrated here as an example, is formed by a set of dots, represented in the Figure by hatched squares. These squares lie within a square or rectangular matrix 10 including n rows and m columns. Matrix 10 is square in shape and consists of seven rows and seven columns C1 to C7. It should however be noted that some characters, such as the letter "I", may be represented by dots lying within a matrix containing a number of columns different from that in the matrix shown in FIG. 1.

In FIG. 2 is illustrated the styli distribution of printing head T of a dot printing machine. In the embodiment illustrated in FIG. 2, printing head T has seven styli M1 to M7 arranged in a matrix including seven rows (X1 to X7) and seven columns (Y0 to Y6) wherein there is only one stylus per row and per column. The seven styli are secured to respective ones of seven actuating arms P1 to P7; each of these arms is actuated by a known mechanism so the stylus secured to each arm temporarily contacts the paper, causing a dot to be printed. In this case, each of these arms forms part of an actuating device of the type described and illustrated in the above mentioned French Pat. No. 2,218,746 corresponding to U.S. Pat. No. 3,971,311. The assembly formed by these actuating devices is shifted relative to the paper in a direction parallel to the rows X1 to X7 of the matrix shown in FIG. 2 in the direction of arrow F. It can be seen from FIG. 2, that actuating arms P1 to P6 are not all arranged on the same side of the matrix, but are arranged in such a way that two consecutive arms, such as P2 and P3 for example, are separated from one another by a space equal to the width d of an arm. The arms are aligned alternately from either side of the matrix to enable each arm to pivot about its shaft without interacting mechanically with a neighboring arm.

The distribution of the styli M1 to M7 within the matrix defined by the rows X1 to X7 and the columns Y0 to Y6 is not restricted to the example illustrated in FIG. 2. Stylus M5, for example, could be situated at the intersection of row X7 and Column Y1; stylus M6 could be situated at the intersection of row X5 and column Y3; and stylus M7 could be situated at the intersection of row X6 and column Y5 without necessitating any alteration in the arrangement of the arms P1 to P7 as shown in FIG. 2. In another embodiment, the styli could be arranged so they are aligned parallel to one of the diagonals of the matrix.

FIG. 3 is a block diagram of a dot recording machine recording control apparatus having at least one recording head having n recording styli arranged in a matrix having n rows and m columns so there is one stylus per row and per column. The actuating devices control the styli regardless of the layout of the styli within the matrix. Generally, this control apparatus comprises at least one bank of n shift registers, one of which is associated with a different one of the n recording styli. Each of the n registers has p+m−1 stages where p=the number of stages in each register=a whole number at least equal to m=the number of columns in a character which the head is capable of printing when the n shift registers have been loaded. Each stage is adapted to contain one binary digit, termed a data bit, which is capable of causing the recording stylus associated with this register to be actuated at predetermined times.

In the embodiment of FIG. 3, the recording control apparatus contains seven shift registers RD1–RD7, respectively associated with seven recording styli M1 to M7. Recording styli RD1–RD7 are arranged in a matrix of seven rows and seven columns (m=n=7). Head 7 prints only a single character each time registers RD1–RD7 are loaded. To print each character, a maximum of only seven printed columns (i.e., p=7) are required. Each of registers RD1 to RD7 contains thirteen stages G1–G6 and J1–J7, each capable of storing one binary data bit. An output from the last stage G1 of each of shift registers RD1 to RD7 is connected to a respective one of seven styli actuating devices A1 to A7, respectively associated with the seven recording styli M1 to M7.

The data bits to be stored in the p stages (J1–J7) of shift registers RD1 to RD7, are derived by data bit generator 20 which is responsive to a six bit parallel alpha-numeric representing a character derived by control processing unit UC on six lead bus K. Generator 20 responds to the six character bits on bus K and timing pulse derived by unit UC on lead F to supply seven pulse signals on leads 201–207 to the initial stage J7 of each of registers RD1–RD7, respectively. The pulses supplied by generator 20 to registers RD1 to RD7 represent bits corresponding to the various dots forming the image of the character to be printed. For example, to print the letter "E", registers RD1 to RD7 are initially loaded as illustrated in FIG. 6, wherein an X represents a binary one bit at the particular register stage. Thus, the locations in which these binary "1" digits are recorded form a reversed image of the printed character, i.e., in the example illustrated by FIG. 6, the image is the reverse of that shown in FIG. 1. However, if the head moves in the opposite direction from the direction indicated by arrow F in FIG. 2, the image formed by the binary "1" digits would be the same as the character to be printed.

In FIG. 4 is illustrated the detailed structure of data generator 20 which loads register RD1 to RD7 in the manner indicated above. Data generator 20 includes a recorder and decoder ED responsive to 6 parallel binary digits representing an alpha-numeric character to be printed, as derived from central unit UC on bus K (marked K1 to K6 in FIG. 4). Recorder and decoder ED has as many outputs SA, SB, SC, . . . , SZ, as there are possibly types of characters to be printed, so that if the 26 letters of the English alphabet are to be printed, there are 26 outputs. Recorder and decoder ED is constructed so a positive binary one potential is derived on one of its outputs whenever it receives a coded combination of six binary digits from the central unit. The output on which the binary one is derived corresponds to the character represented by the combination of the six binary digits. If, for example, the binary combination received by recorder and decoder ED represents the character A, a binary one is derived on output SA of recorder and decoder ED. Similarly, if the coded combination represents character B, a binary one is derived on output SB, etc.

Each of the outputs of recorder and decoder ED is connected to seven parallel gates or circuits, one for each of the seven dots M1-M7. For the sake of simplicity, in FIG. 4 are shown gates CA1-CA7, connected to output SA, and only gates CB1 and DB2 of the seven gates connected to output SB. These gates are of a known type and in one preferred embodiment are similar to those which are described and illustrated in French Pat. Nos. 1,342,787 and 1,387,085 corresponding to U.S. Pat. Nos. 3,293,617 and 3,276,767, respectively.

Each of the gates has two inputs, one, marked with a dot in FIG. 4, is a gated input responsive to time displaced pulses derived from seven taps of delay line RT, in turn responsive to pulses on lead F. The other input to the gates of each group is a gating input responsive to each character output of recorder and decoder ED. Each gate derives, at its output, the pulse applied to its gated input only if its gating input is at a positive potential. The gated inputs of like numbered gates of the differing gate groups are driven in parallel by the signals derived from corresponding numbered taps of delay line RT, so that gates CA1, CB1, etc. are responsive to the pulses on line F1, the gates CA2, CB2, etc. are responsive to the pulses on line F2, etc. Each of the gates is connected to one of the inputs of a planar matrix memory MP which stores seven bit words that are supplied via leads 201 to 207 to registers RD1-RD7 by its output. Preferably, memory MP is of the type described and illustrated in French Pat. No. 1,333,920 corresponding to U.S. Pat. No. 3,319,234 and contains a set of seven ferrite co-planar, parallel rods to store N seven bit words, one for each alpha-numeric character to be printed by head T. Each of the rods is provided with a multi-turn secondary winding and N single turn primary windings extending in a direction perpendicular to the rods. Each primary winding is responsive to the output of a different one of the gates. In response to a primary winding being supplied with a pulse derived from the gate connected to that winding, a voltage pulse is derived across the terminals of the secondary winding of the rod which is magnetically coupled to the primary winding; the voltage pulses from the seven secondary windings are respectively supplied to leads 201-207 and thence to stage J7 of each of registers RD1-RD7.

To transfer or shift a bit stored in stage J7 to stage J6, of each register, a shift control pulse is derived from OR gate U10, responsive to the outputs of delay line RT on leads F1-F7. The shift control pulse is applied in parallel to registers RD1-RD7 via a delay member R1 and seven OR gates U1-U7, one of which is provided for each of registers RD1-RD7. For simplicity, only three OR gates are shown in FIG. 3. Thus, each time a pulse is supplied by delay line RT to one of leads F1-F6, a pulse is derived from one of the gates of FIG. 4 and supplied to memory MP to activate the memory so seven parallel binary 0 or 1 bits are supplied to leads 201 to 207. The bits on leads 201-207 are stored in the seven J7 stages of registers RD1-RD7. The output pulse of OR gate U10 is delayed by delay member R1 to compensate for the delay time between the inputs and outputs of matrix MP. The output of delay member R1, occurring simultaneously with the bits on leads 201-207, is applied to registers RD1-RD7 to shift all the binary bits stored in the registers one stage to the right. Therefore, the seven pulses which are transmitted by line RT on leads F1-F7 enable binary bits to be loaded into and shifted between stages J1-J7 of registers RD1-RD7. Memory MP is arranged in such a way that, when the loading and shifting operation has been completed, the stages in which "1" bits are loaded together form a reversed image of the character to be printed.

As soon as the loading and shifting operation has been completed, a pulse is supplied by central unit UC via lead D to a shift control circuit 30 (FIG. 3) to cause the binary bits loaded in stages J1-J7 of registers RD1-RD7 to be shifted to locations G1 to G6. Shift control circuit 30 includes pulse distributor 31 having six outputs 311-316 connected to corresponding inputs 1-6 of connecting board 32. Pulse distributor 31 responds to each pulse on lead D to derive six sequential pulses on lead 316, five sequential pulses on lead 315, four sequential pulses 314, three sequential pulses on lead 313, two sequential pulses on lead 312, and finally, one pulse on lead 311. Pulse distributor 31, FIG. 5, includes five identical series connected delay elements R31-R35 and five OR gates U32-U36 responsive to the signal on lead D and the outputs of delay elements R31-R35 so that the number of inputs to each of the gates corresponds with the units digit of the gate reference numeral, with the greatest delay being provided by the gates having the lowest units reference numeral. Hence, gate U36 derives a pulse when the central unit UC supplies a pulse to lead D and when a pulse is derived in sequence by each of elements R31-R35. Circuit U35 derives a pulse in response to elements R31-R35 sequentially deriving pulses. Circuit U34 derives a pulse in response to each pulse derived by elements R32-R35. Circuit U33 derives a pulse in response to each pulse derived from elements R33-R35. Circuit U32 derives a pulse in response to each pulse derived from elements R34 and R35. Finally, the delayed pulse which is derived by element R35 is transmitted to output 311 of the pulse distributor.

As shown in FIG. 3, the connecting board 32 includes a set of six input terminals E, a set of seven output terminals S and detachable lead wires C which enable each input terminal E to be connected with one of the output terminals S in a predetermined pattern. Each output terminal S is connected to a respective one of the seven OR gates U1-U7. The six input terminals of board 32 are respectively connected to outputs 311-316 of pulse distributor 31. Conductor leads C are arranged so output pulses of distributor 31 shift the binary bits previously loaded in registers RD1-RD7 in accordance with the relative position occupied by each of the recording styli in the printing head associated with the registers. In particular, for a printing head arranged in a matrix of n rows and m columns of the recording styli, wherein the head is shifted relative to the paper in the direction of the rows, the binary bits contained in the p stages J7-J1 of the register are shifted to the m−1 other stages G1-G6 of the register. The number of stages by which the binary bits are shifted in each register is equal to the serial number of the column in which the recording stylus associated with the register is situated. The columns are numbered serially from 0 to m−1 in the direcion of movement of the head.

Thus, in the embodiment illustrated in FIG. 2, wherein head T is moved relative to the paper in the direction of arrow F and in which the columns Y0 to Y6 are numbered in succession from 0 to 6 in the direction of this arrow, there is no shift in register RD1 associated with stylus M1 since stylus M1 is situated in the column having serial position 0 (i.e., Y0). Similarly, there is a shift of two in register RD2, associated with stylus M2, since stylus M2 is situated in the column in serial position 2 (i.e., Y2) and so on. In this example, connecting board 32 is pre-wired in such a way that output terminal S1 is connected to none of the input terminals of the board, terminal S2 is connected to input terminal E2, terminal S3 is connected to terminal E4, terminal S4 is connected to terminal E6, terminal S5 is connected to terminal E1, terminal S6 is connected to terminal E3, and terminal S7 is connected to terminal E5 to enable the distributor 31 to bring about all these shifts. In this way, the six phase derived from terminal 316 of distributor 31 are supplied to register RD4 to shift the binary bits in register RD4 six stages. Similarly, the five pulses derived from outputs 315 of distributor 31 shift the binary bits loaded in register RD7 five stages, and so on. In FIG. 7 are shown the states of registers RD1 to RD7 when all the shifts have been completed, assuming that the registers were loaded by data bit generator 20 in accordance with the bit pattern of FIG. 6.

As soon as all the shifts have been completed, the printing of the dots making up a character to be formed on the paper is commenced. This printing operation is performed in a plurality of phases under the control of shift pulses which are derived from clock signal generator 40 (FIG. 3), and are applied to registers RD1–RD7 via OR gates U1–U7. Pulses are derived from generator 40 only when the generator has received an input signal indicating that all the shift operations performed by shift control circuit 31 have been completed. The input signal to generator 40 is a pulse derived from output 311 of pulse distributor 31. This pulse is applied to generator 40 via a delay member R2, having a delay time to assure that all of the bits have been properly loaded into stages G1–G6 before any pulses are derived from generator 40. Pulses are derived by generator 40 at a rate equal to the rate at which the printing head T is shifted column by column. If stage G1 of a particular register RD1–RD7 contains a binary "1" bit while a shift pulse is supplied to that register by generator 40 and the OR gate for the register, a binary "1" is applied by the register and applied to the actuator A1–A7 associated with the particular register, whereby a dot is printed on the paper.

There will now be described, by way of example, 13 operating phases necessary to print a given character with printing head T, FIG. 2. It will be assumed in the present case that the character to be printed is "E", as in FIG. 1. To print this character, thirteen successive imprinting operations are required. Printing head T moves in the direction of arrow F in FIG. 2; the state of registers RD1–RD7 is shown in FIG. 7 after the shift operations of shift control circuit 30 have been completed.

During the first phase, recording stylus M4 of printing head T coincides with column C1 (FIG. 1) of the character to be printed. The shift pulse supplied by generator 40 to registers RD1 to RD7 shifts the data bits in these registers one stage to the right, whereby the "1" bit in stage G1 of register RD4 is supplied to actuating device A4. In response to the "1" bit being supplied to device A4, stylus M4 is energized, which results in dot C1, L4 being printed. Head T is then shifted one column to the right.

During the second phase, styli M4 and M7 respectively coincide with columns C2 and C1 of the character to be printed. As a result of the shift caused by the pulse which is transmitted by generator 40 and applied to registers RD1 to RD7, the "1" bit contained in stage G1 of register RD7 is supplied to actuator A7. Actuator A7 for stylus M7 is then energized, and results in dot C1, L7 being printed. Head T is then shifted one column to the right.

During the third phase, styli M4, M7 and M3 respectively coincide with columns C3, C2 and C1 of the character to be printed. As a result of the shift resulting from the pulse supplied by generator 40 to registers RD1 to RD7, the "1" bits contained in stage G1 of registers RD3 and RD4 are simultaneously supplied to actuators A3 and A4, whereby styli M3 and M4 are energized and two dots C3, L4 and C1, L3 are simultaneously printed. Head T is then shifted one column to the right.

During the fourth phase, styli M4, M7, M3 and M6 respectively coincide with columns C4, C3, C2 and C1 of the character to be printed. As a result of the shift resulting from the pulse supplied by generator 40 to registers RD1 and RD7, the binary "1" bits contained in stage G1 of registers RD6 and RD7 are supplied to actuating devices A6 and A7. Styli M6 and M7 are thus energized, whereby two dots C3, L7 and C1, L6 are printed. Head T is then shifted one column to the right.

Subsequent phases progress similarly to the phases described in detail above. So the description is not of escessive length, the following description is limited to the dots which are printed during phases five to thirteen.

Fifth phase: Dots C5, L4 and C1, L2.
Sixth phase: Dots C5, L7 and C1, L5.
Seventh phase: Dots C1, L1.
Eighth phase: Dot C7, L7.
Ninth phase: Dot C3, L1.
Tenth phase: No dot printed.
Eleventh phase: Dot C5, L1.
Twelfth phase: No dot printed.
Thirteenth phase: Dot C7, L1.

Because no adjoining column and row position includes two printing elements, there is no interference between the elements when a pair of elements are simultaneously energized. Every possible alpha-numeric combination can be formed by the printing elements because there is at least one element in each column and row and because of the shifting sequence of the pulses supplied to gates U1–U7 after pulses from data generator 20 have been loaded into registers RD1–RD7.

The invention is not, of course, restricted to the embodiments illustrated in FIG. 3. In cases where head T prints a plurality of characters in succession without reloading registers RD1 to RD7 after a character has been printed, it is necessary for each of these registers to contain a number of recording stages greater than that shown in FIG. 3. Thus, if it is desired for head T to successively print twenty-four characters spaced from each other by one column and formed of dots situated in a matrix containing seven rows and a maximum of seven columns, each of the registers RD1–RD7 contains $(24 \times 7) + 23 + 191$ stages plus the six stages required to shift the stored bits, whereby each register includes 197 stages.

Similarly, the number of outputs from the pulse distributor is not restricted to six as described, but the distributor may have $m - 1$ outputs. Under these conditions the connecting board has $m - 1$ input terminals and $n$ output terminals.

To print a line of characters, this recording control apparatus can control a printing machine having identical recording head, each of which prints the same plurality (N) of characters. The structure of a control apparatus for a printing machine of this type is shown in schematic form in FIG. 8.

The apparatus shown in FIG. 8 contains k banks of shift registers RD, one bank being provided for each of the recording heads. Each shift register bank includes n shift registers, each containing p+m−1 stages. For simplicity, only two banks of registers are shown in FIG. 8. The first bank contains seven shift registers RD11, RD21, . . . , RD71 respectively associated with seven actuating devices A11, A21, . . . , A71 for actuating the styli of a recording head T1. The second bank similarly contains seven shift registers RD12, RD22, . . . , RD72 respectively associated with seven actuating devices A12, A22, . . . , A72 of the styli of recording head T2.

All of registers RD are loaded by the seven bit output of data bit generator 20, which is coupled to the inputs of registers RD via stepping switches D1, D2, . . . , D7, one of which is provided for each of the seven registers RD1–RD7 of all the register banks, to enable each bank of registers to be separately loaded. Each of switches D1–D7 has as many output terminals as there are banks of registers and an input terminal connected to a different output terminal 201–207 of bit generator 20. Each of switches D1–D7 includes a contact that is advanced one step each time a step control input of the switch is supplied with a pulse derived by central unit UC on conductor G. The output terminals of switch D1 are respectively connected to the inputs of the first registers RD11, RD12, of all the register banks. Similarly, the output terminals of switch D2 are respectively connected to the inputs of the second registers RD21, RD22, etc. of all the banks.

An additional stepping switch DO includes an input terminal C responsive to the output of the delay member R1 and a step control input terminal responsive to the signal on lead G. Switch DO includes plural output terminals one for each register bank. Each of the outputs of switch DO is applied in parallel to a shift input of all the shift registers of the bank associated with the particular output via an OR gate U connected to the shift input; OR gates U11, U21, . . . , U71, U21, U22, . . . , U72 are the only gates illustrated in FIG. 8. Hence, switch DO enables the shift controlling pulses derived from delay member R to be transmitted to the bank of shift registers which is currently being loaded. When a bank of registers has been completely loaded, all of switches D0–D7 are stepped to the next output terminal by a pulse derived by central unit UC and applied to the switches via conductor G, whereby the next bank of registers can be loaded by bit generator 20.

When all these loading operations have been completed, central unit UC supplies a pulse to shift control circuit 30 via lead D. The pulse on lead D causes the binary bits stored in the register banks to be shifted as described above.

After the bits in the register banks have been shifted in response to the outputs of circuit 30, dot printing the characters to be formed on the paper begins in response to pulses supplied to all the shift registers by the clock signal generator 40, via OR gates U.

While there have been described and illustrated several specific embodiments of the invention, it will be clear that variations in the details of the embodiments specifically illustrated and described may be made without departing from the true spirit and scope of the invention as defined in the appended claims. For example, the ferrite rod memory may be replaced by one or more integrated circuit memories which operate in a similar fashion to that described above.

What is claimed is:

1. A recording control apparatus for a dot recording machine including a recording medium and at least one character recording head having n electric pulse responsive recording styli arranged in a matrix of n rows and m columns, at least one stylus being provided in each row, the medium and the head being relatively displaceable in the direction of the rows, the columns being numbered serially as 0, 1, 2, . . . , q, . . . , (m−1) in the direction in which the head moves relative to the recording medium, the control apparatus comprising:

at least one bank of n shift registers, each of the registers being associated with one of the recording styli, each register having p+m−1 stages, each of the stages storing a data bit required to cause one dot to be recorded, where p is a whole number at least equal to m, a data bit generator for supplying data bits for the character to be recorded to the first p stages of said registers in the same way as if the recording styli were aligned in a single column, and a shift control circuit for shifting the data bits stored in the first p stages in each register to the other m−1 stages in the register, the number of stages by which the bits are shifted being equal to the serial number q of the column in which the recording stylus associated with the register is located.

2. The recording control apparatus of claim 1 wherein the shift control circuit includes a pulse distributor having m−1 outputs and a connecting board, said pulse distributor being responsive to a loading pulse indicating that the data bit generator has loaded the first p stages of the register with the data bits for the character to be recorded so that j pulses are sequentially derived from the jth output in response to each loading pulse from the time at which the distributor is activated by the loading pulse, where j=1, 2, . . . , m−1, the connecting board having: m−1 input and n output terminals, each input terminal being responsive to a different output of the pulse distributor, each output terminal supplying a signal to a different one of the n shift registers, and a set of leads interconnecting each input terminal to one of the output terminals in a predetermined arrangement, the arrangement being such that the register which is associated with the recording stylus situated in the qth column responds to q successive pulses derived from the qth output of the distributor.

3. The apparatus of claim 2 wherein each of the leads is detachable from at least one of its terminals.

4. The recording control apparatus of claim 1 or 2 wherein the data bit generator has n outputs, each output of a data bit generator supplying character indicating bits for a particular stylus to a different one of the n shift registers, whereby the data bits derived from each of the generator outputs is stored in the shift register for the stylus.

5. The recording control apparatus of claim 1 or 2, wherein the machine includes K recording heads, where K is greater than one, K banks of shift registers, each associated with a respective one of the said heads, one register in each bank being associated with a different stylus of the head associated with the bank, and switching means connected between the data bit generator and the banks of registers, said switching means sequentially coupling bits from the data bit generator to the banks until a bank which is responsive to the generator has received all the data bits for one character.

6. A recording control apparatus of claim 5 wherein the recording heads are identical and each bank includes n shift registers, the data bit generator having n outputs, the switching means including n stepping switches, each of the stepping switches having an input terminal and K output terminals, the input terminal being responsive to a different one of the n outputs of the bit generator, the output terminals of the ith stepping switch being connected to supply bits to all the shift registers in the ith bank, where $i = 1, 2, \ldots, K$.

7. The recording control apparatus according to claim 1 or 2 or 3 further including a clock signal generator having an output coupled to a shift input of all the shift registers, said clock generator including means responsive to an enabling pulse for supplying output pulses to the shift registers so that a binary data bit is derived from each register for each output pulse of the clock signal generator, each binary one data bit derived from a register actuating a recording stylus associated with the register.

8. The recording control apparatus of claim 7 further including a control unit for activating the data bit generator and the shift control circuit, said unit supplying signals to the generator and shift circuit so the data bit generator initially derives data bits and, when the data bits have been stored in the p locations of the shift registers, the shift control circuit is activated so that the data bits are shifted to the $m-1$ other locations of the registers.

* * * * *